(12) United States Patent
Hisada (10) Patent No.: US 9,479,020 B2
(45) Date of Patent: Oct. 25, 2016

(54) ELECTRIC MACHINE WITH STATOR'S WELDED-SIDE PITCH LESS THAT ROTOR'S PITCH

(75) Inventor: Tomokazu Hisada, Anjo (JP)

(73) Assignee: DENSO CORPORATION, Kariya (JP)

( * ) Notice: Subject to any disclaimer, the term of this patent is extended or adjusted under 35 U.S.C. 154(b) by 836 days.

(21) Appl. No.: 13/338,603

(22) Filed: Dec. 28, 2011

(65) Prior Publication Data

US 2012/0161569 A1    Jun. 28, 2012

(30) Foreign Application Priority Data

Dec. 28, 2010  (JP) ................................ 2010-292982
Aug. 22, 2011  (JP) ................................ 2011-180135
Dec. 8, 2011   (JP) ................................ 2011-269141

(51) Int. Cl.
    *H02K 3/28*     (2006.01)
    *H02K 15/00*    (2006.01)

(52) U.S. Cl.
    CPC ............ *H02K 3/28* (2013.01); *H02K 15/0081* (2013.01)

(58) Field of Classification Search
    CPC ............. H02K 13/08; H02K 15/0081; H02K 3/00–3/528
    USPC ......................... 310/179, 180, 195, 201, 208
    See application file for complete search history.

(56) References Cited

U.S. PATENT DOCUMENTS

| 6,114,784 | A | * | 9/2000 | Nakano ........................... 310/59 |
| 6,326,715 | B1 | | 12/2001 | Asao |
| 6,798,106 | B2 | * | 9/2004 | Nakamura et al. ........... 310/179 |
| 7,800,273 | B2 | * | 9/2010 | Shichijoh ................. H02K 3/28 310/208 |
| 2003/0132680 | A1 | * | 7/2003 | Nakamura et al. ........... 310/180 |
| 2003/0214190 | A1 | * | 11/2003 | Congdon et al. ................ 310/71 |
| 2005/0206248 | A1 | * | 9/2005 | Raszkowski et al. .......... 310/54 |
| 2009/0267441 | A1 | * | 10/2009 | Hiramatsu et al. ........... 310/208 |
| 2009/0322167 | A1 | * | 12/2009 | Ishizuka .................. H02K 3/50 310/54 |
| 2010/0133944 | A1 | * | 6/2010 | Fujisawa et al. ............. 310/195 |

(Continued)

FOREIGN PATENT DOCUMENTS

| JP | 2001-169489 | 6/2001 |
| JP | P2003-209956 A | 7/2003 |

(Continued)

OTHER PUBLICATIONS

Machine translation of JP 2008245489 A.*

(Continued)

*Primary Examiner* — Thomas Truong
(74) *Attorney, Agent, or Firm* — Nixon & Vanderhye P.C.

(57) ABSTRACT

The stator of the electric rotating machine includes a stator winding constituted of a plurality of U-shaped conductor segments each including a turn portion and two straight portions, the U-shaped conductor segments being connected in series by welding at welded portions formed in ends of the straight portions, and a stator core formed with slots, the straight portions of each U-shaped conductor segment being accommodated in corresponding two of the slots. The welded side slot pitch as an interval of the corresponding two of the slots on the side opposite to the turn portions is narrower than the N-S magnetic pole pitch of the rotor. The stator winding includes overlapped wire wrapping sections each constituted of the U-shaped conductor segments accommodated in the corresponding two of the slots, and crossover wires disposed on the side of the welded portions for connecting the overlapped wire wrapping sections.

7 Claims, 6 Drawing Sheets

(56) References Cited

U.S. PATENT DOCUMENTS

2011/0298316 A1* 12/2011 Bradfield .................... 310/58
2011/0298317 A1* 12/2011 Bradfield .................... 310/58

FOREIGN PATENT DOCUMENTS

| JP | 2003-235191 | 8/2003 |
| JP | P2007-228708 A | 9/2007 |
| JP | 2008-245489 | 10/2008 |
| JP | 2009-095168 | 4/2009 |

OTHER PUBLICATIONS

Machine Translation, Fukushima, JP 2008245489 A, Oct. 9, 2008.*
JPO Machine Translation, Fukushima, JP 2008245489 A, Oct. 9, 2008.*
Office Action (2 pages) dated Oct. 15, 2013, issued in corresponding Japanese Application No. 2011-269141 and English translation (3 pages).

\* cited by examiner

ELECTRIC MACHINE WITH STATOR'S WELDED-SIDE PITCH LESS THAT ROTOR'S PITCH

This application claims priority to Japanese Patent Applications No. 2010-292982 filed on Dec. 28, 2010, No. 2011-180135 filed on Aug. 22, 2011, and No. 2011-269141 filed on Dec. 8, 2011, the entire contents of which are hereby incorporated by reference.

BACKGROUND OF THE INVENTION

1. Field of the Invention

The present disclosure relates to an electric rotating machine mounted on a vehicle such as a passenger car.

2. Description of Related Art

There is known an electric rotating machine including a stator winding constituted of U-shaped conductor segments joined by welding to one another. For example, refer to Japanese Patent Application Laid-open No. 2003-209956. The electric rotating machine disclosed in this patent document is increased in rigidity of the coil end on the side of the turn portions to improve vibration-resistance by setting the pitch of the coil end formed by the turn portions of the conductor segments on the side of the turn portions narrower than the N-S magnetic pole pitch. More specifically, the interval in the circumferential direction between two conductors connected to one turn portion of one U-shaped conductor segment is set to 150 degrees in electrical angle which is narrower than the N-S magnetic pole pitch equal to 180 degrees in electrical angle.

However, the above conventional electric rotating machine has a problem in that since the pitch of the coil end on the welded side of the conductor segments opposite to the coil end on the side of the turn portions is set to 180 degrees, the distance between the end surface of the stator core and each welded portion is large, the vibration-resistance of the coil end on the welded side is lowered. This problem increases when the conductor segments are thick and heavy to carry a large current.

SUMMARY

An exemplary embodiment provides an electric rotating machine comprising:

a stator including a stator winding constituted of a plurality of U-shaped conductor segments each including a turn portion and two straight portions, the U-shaped conductor segments being connected in series by welding at welded portions formed in ends of the straight portions, and a stator core formed with slots, the straight portions of each U-shaped conductor segment being accommodated in corresponding two of the slots; and a rotor formed with magnetic poles, wherein a welded side slot pitch as an interval of the corresponding two of the slots in a circumferential direction of the stator core on the side opposite to the turn portions is narrower than an N-S magnetic pole pitch of the rotor, and the stator winding includes overlapped wire wrapping sections each constituted of the U-shaped conductor segments accommodated in the corresponding two of the slots, and crossover wires disposed on the side of the welded portions for connecting the overlapped wire wrapping sections.

According to the exemplary embodiment, there is provided an electric rotating machine having a stator winding constituted of U-shaped conductor segments connected in series by welding at their welded portions opposite to their turn portions, which is improved in vibration-resistance at the coil end on the side of the welded portions.

Other advantages and features of the invention will become apparent from the following description including the drawings and claims.

PREFERRED EMBODIMENTS OF THE INVENTION

Figure 1:
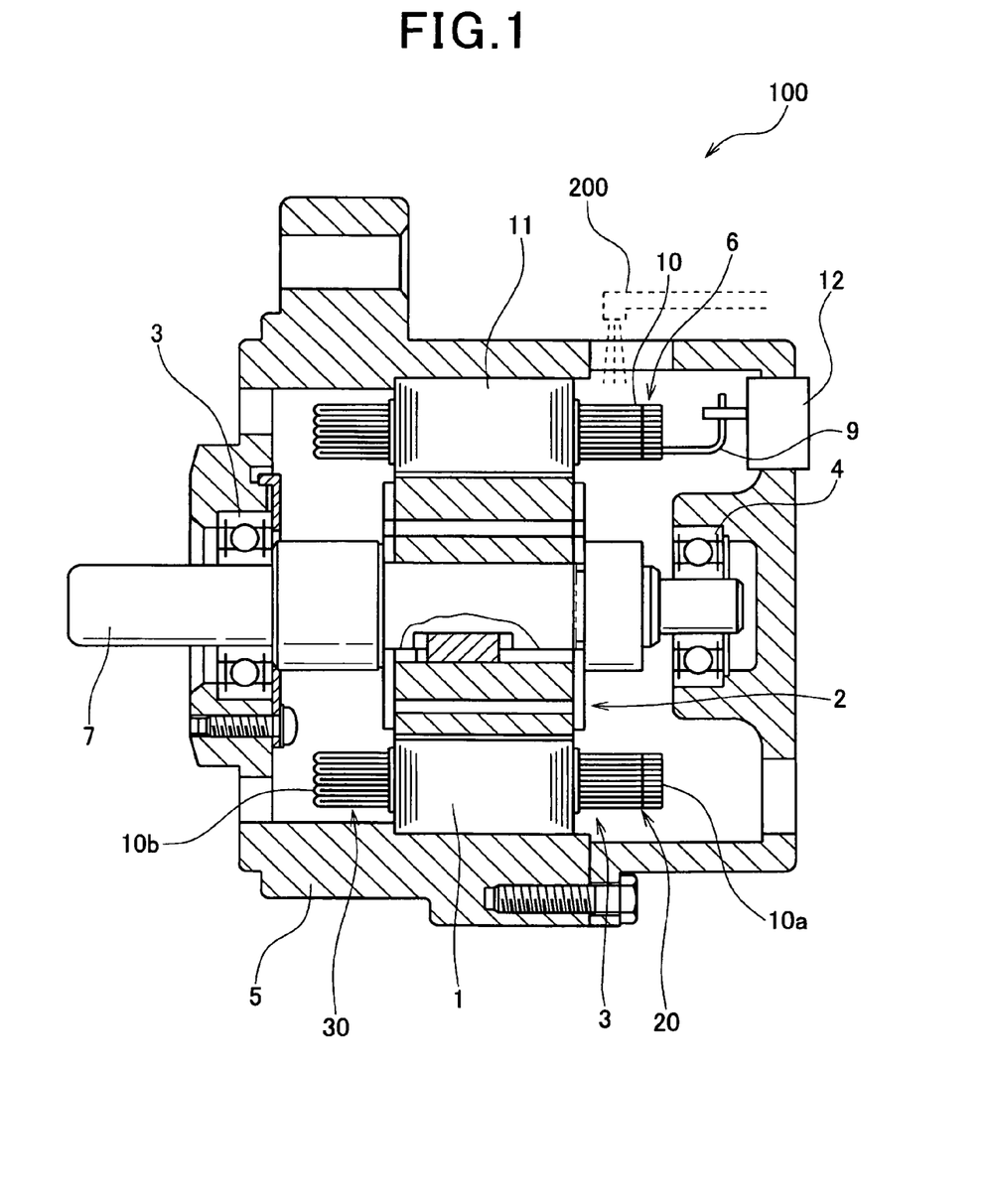
FIG. 1 is a cross-sectional view of a vehicle-use electric rotating machine according to an embodiment of the invention.

FIG. 1 is a cross-sectional view of a vehicle-use electric rotating machine 100 according to an embodiment of the invention. As shown in FIG. 1, the electric rotating machine 100 includes a stator 1, a rotor 2, a front bearing 3, a rear bearing 4 and a frame 5.

The stator 1 includes a cylindrical stator core 11 with slots formed along its circumferential direction, and conductor segments 10 constituting a stator winding 6 as a multiple star-connected phase winding (three-phase winding including U-phase, V-phase and W-phase windings in this embodiment).

The stator core 11 is formed as a laminated core fabricated by stacking laminated steel sheets of a predetermined thickness. The stator winding 6 is supplied with a current from a three-phase inverter control circuit (not shown).

The rotor 2, which is disposed inside the stator 1, is embedded with permanent magnets. The rotating shaft 7 of the rotor 2 is rotatably supported by the front bearing 3 and the rear bearing 4. The frame 5 houses the front bearing 3 and the rear bearing 4.

The frame 5 is provided with a terminal case 12 housing three connection terminals connected with lead wires 9 drawn from the respective phases of the stator winding 6. The three-phase inverter control circuit is connected to these three connection terminals. The electric rotating machine 100 can operate as a motor when a three-phase AC voltage outputted from the three-phase inverter control circuit is applied to the stator winding 6. On the other hand, the electric rotating machine 100 can operate as an alternator when a three-phase AC voltage induced in the stator winding 6 is rectified by the three-phase inverter control circuit.

The stator winding 6 is constituted of flat U-shaped conductor segments 10 having a rectangular cross-section. The conductor segments 10 are inserted into the slots of the stator core 11 from one axial end surface of the stator core 11 such that projection ends of the conductor segments project by a necessary length from the slots on the side of the other axial end surface. The projection ends of each conductor segment 10 are twisted in the circumferential direction and jointed by welding to the projection ends of a corresponding one of the conductor segments 10. By connecting the U-shaped conductor segments 10 each having a straight portion and a turn portion 10b to one another in series by welding, the stator winding 6 is formed.

Figure 2:
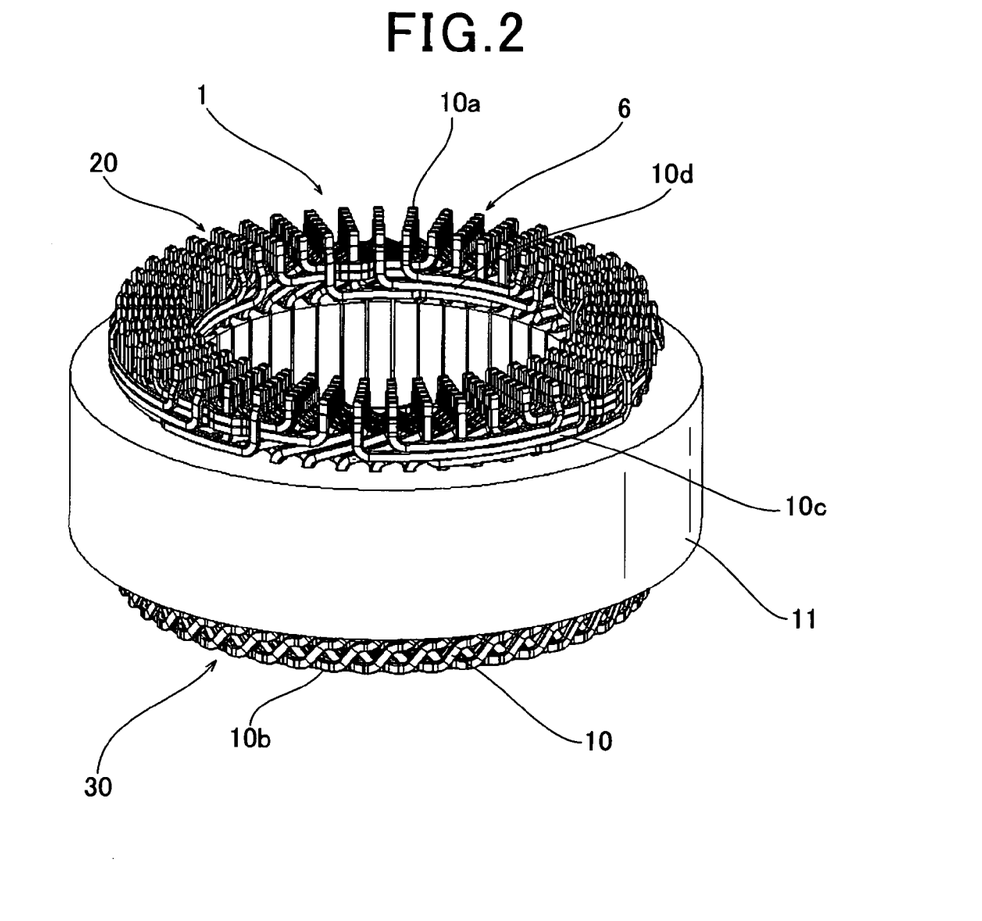
FIG. 2 is an external perspective view of a stator of the vehicle-use electric rotating machine constituted of a stator core and a stator winding.
Figure 3:
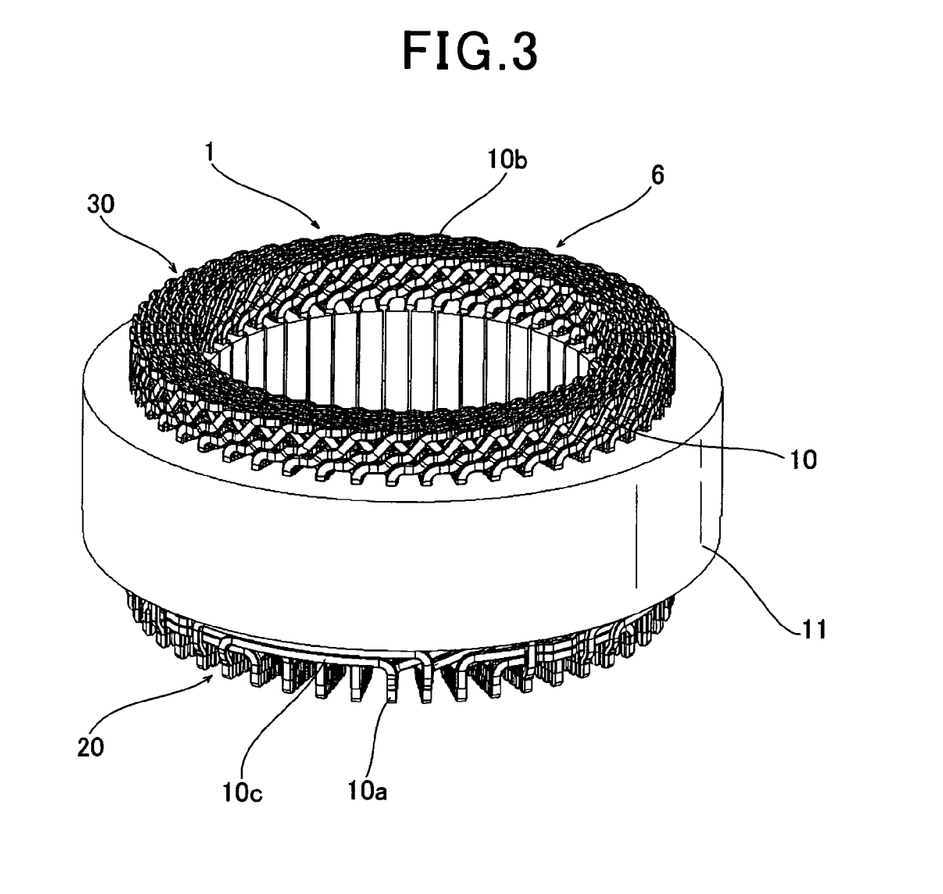
FIG. 3 is an external perspective view of the stator of the vehicle-use electric rotating machine constituted of the stator core and the stator winding.

FIG. 2 is an external perspective view of the stator 1 constituted of the stator core 11 and the stator winding 6 as viewed from the side of welded portions 10a of the conductor segments 10. FIG. 3 is an external perspective view of the stator 1 as viewed from the side of the turn portions 10b of the conductor segments 10. In FIGS. 2 and 3, the lead wires 9 extending from the stator winding 6 to the terminal case 12 are omitted from illustration.

Next, the structure of the stator winding 6 is explained in detail. The stator winding 6 includes a coil end 20 on the side of the welded portions 10a and a coil end 30 on the side of the turn portions 10b.

In the coil end 20 on the side of the welded portions 10a, the slot pitch (referred to as "welded portion side slot pitch" hereinafter), or the interval along the circumferential direction between the two straight portions of each conductor segment 10 accommodated in two of the slots and connected to the welded portions 10 formed on the end opposite to the turn portions 10b, is set narrower than the N-S magnetic pole pitch of the rotor 2.

Likewise, in the coil end 30 on the side of the non-welded portions, the slot pitch (referred to as "non-welded portion side slot pitch" hereinafter), or the interval along the circumferential direction of the two straight portions of each conductor segment 10 accommodated in two of the slots and connected to the turn portions 10b, is set narrower than the N-S magnetic pole pitch of the rotor 2.

Figure 4:
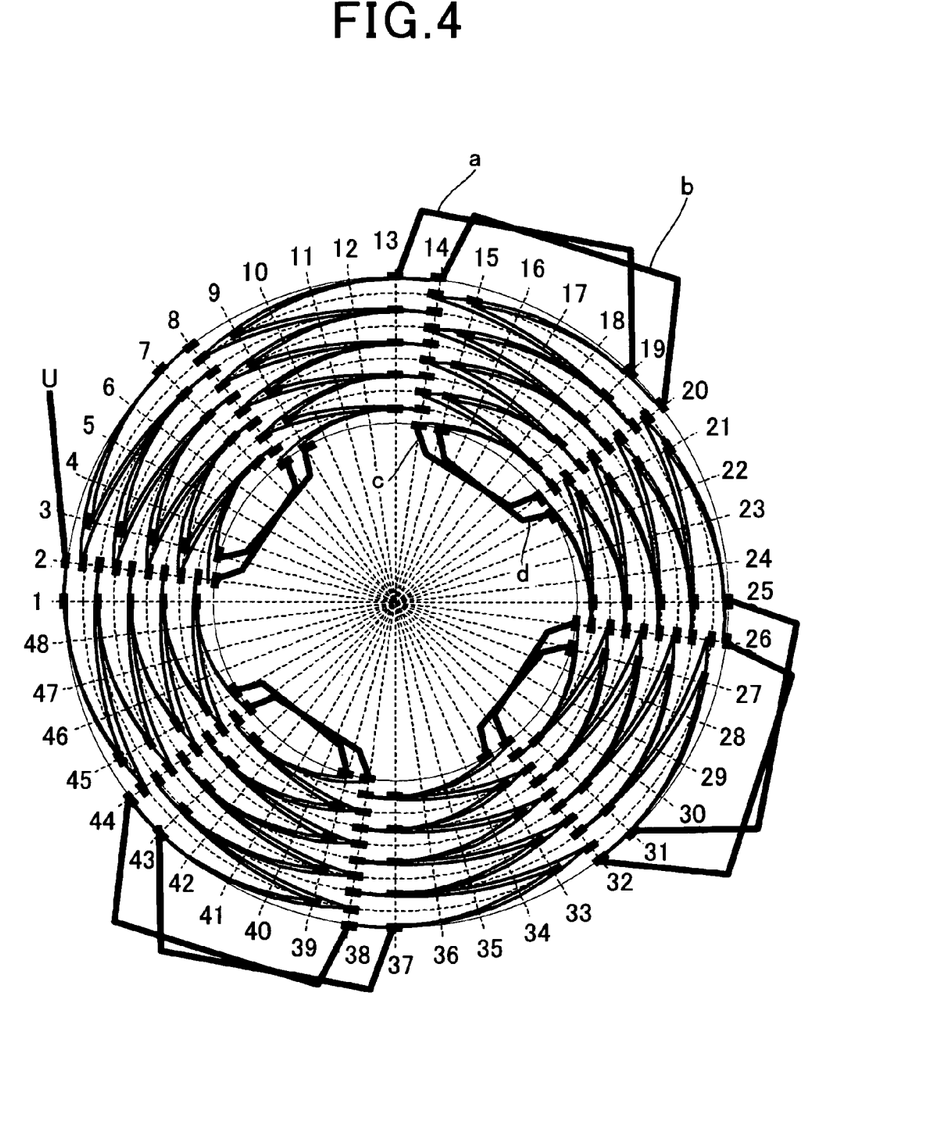
FIG. 4 is a diagram schematically showing the wiring structure of the stator winding.
Figure 5:
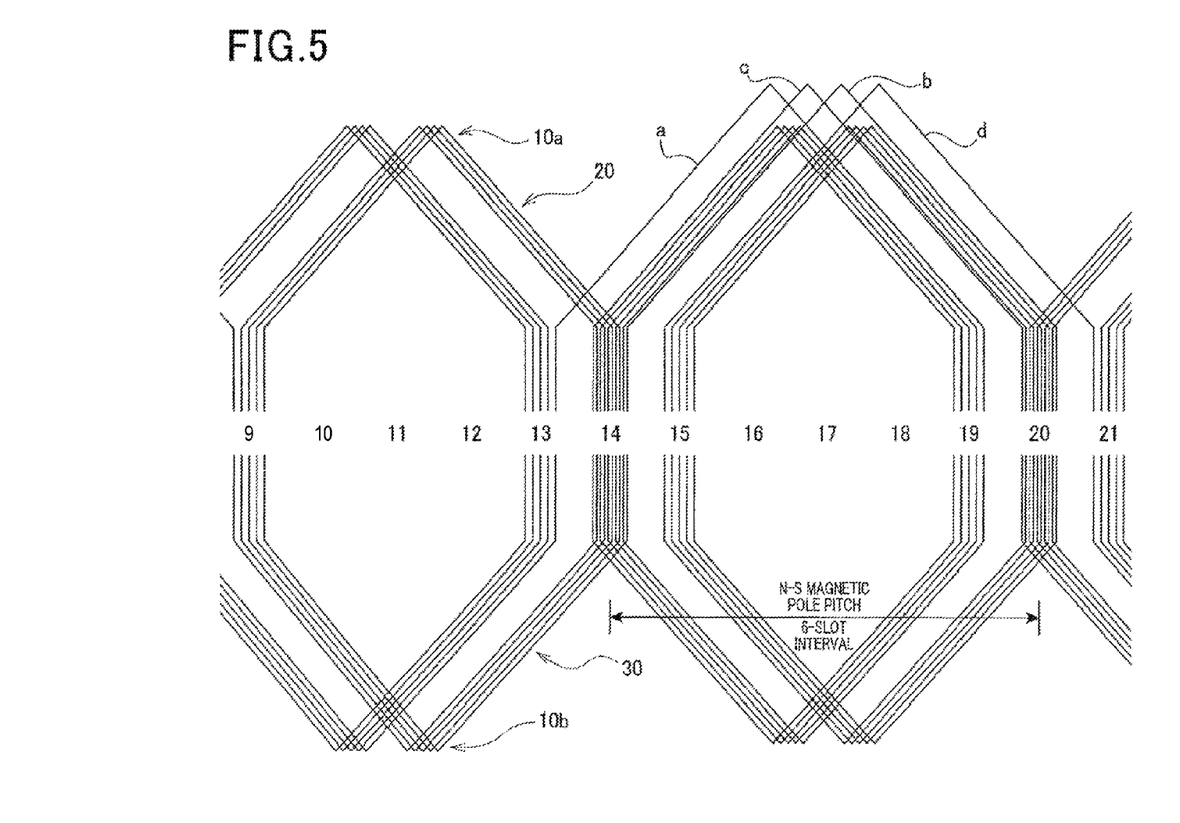
FIG. 5 is a diagram showing part of the wiring spec of the stator wiring.

FIG. 4 is a diagram schematically showing the wiring structure of the stator winding 6. FIG. 5 is a diagram showing part of the wiring spec of the stator wiring 6. In FIGS. 4 and 5, of the U-phase, V-phase and W-phase windings, only the U-phase winding is shown. In these figures, the numeric values indicate the slot numbers. In FIG. 4, the radial positions of the conductors accommodated in the slots are shown by ten concentric circles. In FIG. 5, the coil end 20 including the welded portions 10a is shown in the upper part of the drawing, and the coil end 30 including the turn portions 10b is shown in the lower part of the drawing.

In this embodiment, the N-S magnetic pole pitch is equal to the six-slot interval of the stator core 1, while the welded side pole pitch and the non-welded side slot pitch are set to the five-slot interval of the stator core 1 narrower than the N-S magnetic pole pitch. For example, 4.5-turn overlapped wire wrapping with the welded side slot pitch and the non-welded side slot pitch being set to the five-slot interval is done to form a coil using each two of the slots, for example, the slot #9 and the slot #14. Likewise, 4.5-turn overlapped wire wrapping with the welded side slot pitch and the non-welded side slot pitch being set to the five-slot interval is done to form a coil using the slot #15 and the slot #20. These two coils are connected to each other by the crossover wires c and d as shown in FIG. 4. In FIG. 4, the crossover wires c and d are for connecting the conductor segments 10 disposed on the inner most side at their ends, and the crossover wires a and b are for connecting the conductor segments 10 disposed on the outer most side at their ends.

In FIG. 2, the crossover wires c and d are designated by 10d, and the crossover wires a and b are designated by 10c. As shown in FIG. 2, these crossover wires 10c and 10d extend in the circumferential direction at positions radially outward or inward of the coil end 20. By using these crossover wires 10c and 10d, it becomes possible to reduce the axial length of the coil end 20 including the crossover wires 10c and 10d. In addition, by disposing the crossover wires 10c and 10d respectively radially outwardly and inwardly of the coil end 20, routing of the crossover wires becomes easy compared to a case in which the crossover wires 10c and 10d are disposed on the radially same side. Incidentally, the crossover wires 10c and 10d may be disposed on the radially same side when there is no difficulty in the routing of the crossover wires.

In this embodiment, the slot #13 and the slot #15 respectively accommodating five conductors of the U-phase winding are located such that the slot #14 accommodating ten conductors of the U-phase winding is located between the slot #13 and the slot #15. One of the slot #13 and the slot #15 further accommodates five conductors of the V-phase winding, and the other of the slot #13 and the slot #15 further accommodates five conductors of the W-phase winding. As explained above, both the welded side slot pitch and the non-welded side slot pitch can be set to the five-slot interval by employing the overlapped winding in which two of the U-, V- and W-phase windings partially overlap with each other in the circumferential direction.

Figure 6:
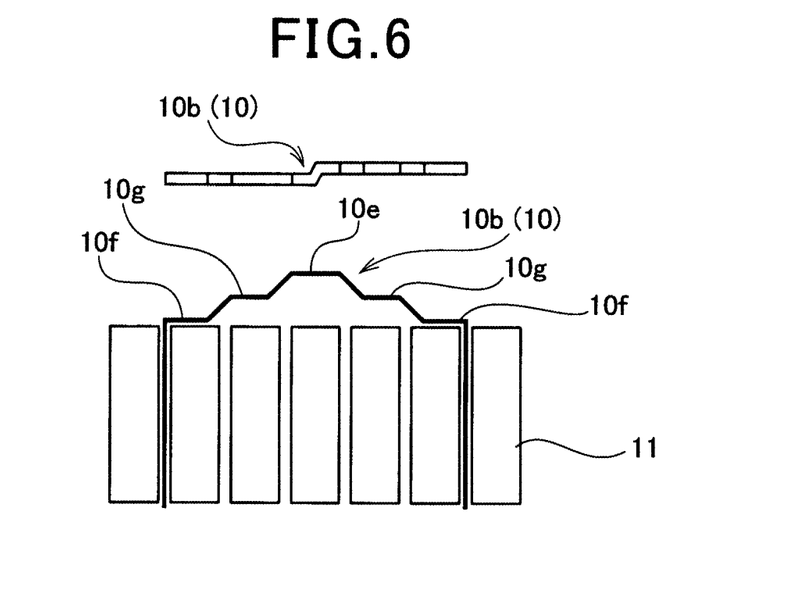
FIG. 6 is a diagram showing the shape of turn portions of conductor segments of the stator winding.

Further, in this embodiment, the turn portions 10b of the conductor segments 10 constituting the coil end 30 on the non-welded side are formed in a stepped shape. FIG. 6 is a diagram showing the shape of the turn portion 10b.

As shown in FIG. 6, the turn portion 10b includes at around its center a crank portion 10e not twisted. The crank portion 10e, which is located at a position most distant from the stator core 11 is formed in a crank shape so as to extend in the direction parallel to the axial end surface of the stator core 11. The crank height of the crank portion 10e is approximately equal to the width of the conductor segment 10. Accordingly, the turn portions 10b of the radially adjacent conductor segments 10 can be laid on each other so that the turn portions 10b can be overlapped thickly. This makes it possible to reduce the radial width of the coil end 30 to thereby prevent the coil end 30 from projecting radially outwardly.

Further, the turn portion 10b includes step portions 10f at positions projecting from the slots outwardly of the stator core 11. Each of the step portions 10f of the conductor segment 10, which projects from one of the two slots in which this conductor segment 10 is inserted, extends along the axial end surface of the stator core 11 toward the other one of the two slots. Accordingly, as shown in FIG. 6, the distance between the two projecting portions of the turn portion 10b at which the turn portion 10b projects from the slots, that is, the length of the base of a triangular portion which the turn portion 10b forms outside the stator core 11 is shorter than the interval between the two slots in which the same conductor segment 10 is inserted. This makes it possible to reduce the height of the coil end 30. Further, since all the turn portions 10b include the step portions 10f at the positions at which they project from the slots outwardly of stator core 11, the conductor segments 10 can be made small, and accordingly the coil end 30 can be made small.

When the length of the step portion 10f along the axial end surface of the stator core 11 is D1 and the interval between adjacent two slots is D2, they are in the relationship of D1≤D2. Accordingly, the step portion 10f can be prevented from interfering with the conductor segment 10 projecting from the adjacent slot. This makes it unnecessary to increase the height or the width in the circumferential direction of the coil end 30 to prevent interference between the conductor segments 10 projecting from the adjacent slots. As a result, the height of the coil end 30 can be reduced, and the stator winding 6 can be prevented from projecting outwardly in the radial direction, since the width of the coil end 30 in the radial direction can be made small.

The turn portion 10b of the conductor segment 10 is also formed with a step portion 10g between the crank portion be and each of the two step portions 10f. Accordingly, the height of the turn portion 10b can be greatly reduced compared to a case in which the step portions 10f and 10g and the crank portion 10e are not formed. Like the step portion 10f, the step portion 10g is formed in a shape extending in parallel with the axial end surface of the stator core 11. Accordingly, the turn portion 10b has a stepped shape including a plurality of steps along the axial direction of the stator core 11 on either side of the crank portion 10e. The length D3 of the step portion 10g which is parallel to the axial end surface of the stator core 11 is smaller than the interval D2 between the adjacent slots. Accordingly, the turn portion 10b can be prevented from interfering with another turn portion 10b projecting from the adjacent slot. This makes it unnecessary to increase the height or the width in the circumferential direction of the coil end 30 to prevent the interference.

As explained above, according to the above embodiment, since the length of the coil end 20 on the welded side can be reduced by setting the welded side slot pitch shorter than the N-S magnetic pole pitch, it is possible to increase the vibration-resistance of the coil end 20 on the welded side. In addition, since the length of the coil end 20 is small, variation of the length with temperature of the conductor segments 10 leading to the welded portions 10a is small, and accordingly the stress repeatedly applied to the welded portions 10b can be reduced to thereby increase the reliability of the welded portions 10a. Further, since the coil end 20 is short, and also the number of other conductors overlapped to the conductor leading to the welded portion 10a can be reduced by one, the accumulated dimension tolerance in the axial direction can be reduced, and the height from the axial end surface of the stator core 11 to the end of the welded portion 10a of the coil end 20 on the welded side can be reduced, as a result of which the vehicle-use electric rotating machine 100 can be made compact in size. Particularly, by narrowing both the welded side slot pitch of the coil end 20 and the non-welded side slot pitch of the coil end 30, the vibration-resistance of the whole stator winding 6 can be further increased, and the axial length of the whole stator winding 6 can be reduced.

Further, since the overlapped wire wrapping sections are connected with one another by the crossover wires a, b, c and d disposed on the side of the welded portions 10a, the vibration-resistance of the coil end 20 on the side of the welded portions 10a can be further improved. The crossover wires a, b, c and d include the ones for connecting the conductor segments 10 disposed on the inner most side at their ends, and the ones for connecting the conductor segments 10 disposed on the outer most side at their ends. Such the crossover wires a, b, c and d can be disposed without being projected radially from the coil end 20 and without being routed complicatedly. Accordingly, provision of such the crossover wires a, b, c and d makes it possible to reduce the axial body size of the stator 1 and the electric rotating machine 100 including the stator 1.

It is a matter of course that various modifications can be made to the above described embodiment as described below.

In the above embodiment, the three-phase inverter control circuit is connected to the vehicle-use electric rotating machine 100. However, the three-phase inverter control circuit may be integrated in the electric rotating machine 100. The electric rotating machine 100 may be configured to operate as one of a motor and an alternator.

In the above embodiment, each slot accommodates ten conductors. However, each slot may accommodate more than or less than ten conductors. In the above embodiment, as shown in FIG. 2, the crossover wires 10c and 10d are disposed so as to extend in the circumferential direction near the coil end 20 on the welded side. However, the crossover wires 10c and 10d may be drawn through the slots toward the coil end 30 so that they extend in the circumferential direction near the coil end 30 on the non-welded side.

The above embodiment employs overlapped wire wrapping using the crossover wires as a winding method. However, the above embodiment may employ wave winding. In this case, the slot pitch is set to the five-slot interval for the coil end 20 on the welded side, and set to six-slot interval for the coil end 30 on the non-welded side, for example.

In the above embodiment, as shown in FIG. 2, since the crossover wires 10c and 10d are disposed so as to extend in the circumferential direction near the coil end 20 on the welded side, when the stator winding 6 is cooled using liquid coolant (cooling oil), it is possible to increase cooling performance by using the crossover wires 10c and 10d (especially, the crossover wires 10c on the radially outer side of the coil end). In FIG. 1, a coolant supply tube 200 is indicated by the dotted line. When coolant is supplied to the vicinity of the crossover wires 10c on the radially outer side through the supply tube 200, since the coolant spreads over the whole coil end 20, the coil end 20 can be cooled efficiently. Further, since the crossover wires 10d are disposed on the radially inner side of the coil end 20, the coolant can stay in the coil end 20 for a long time, as a result of which the efficiency of heat exchange between the hot coil end 20 and the coolant can be increased.

The above explained preferred embodiments are exemplary of the invention of the present application which is described solely by the claims appended below. It should be understood that modifications of the preferred embodiments may be made as would occur to one of skill in the art.

What is claimed is:
1. An electric rotating machine comprising:
   a stator including a stator winding constituted of a plurality of U-shaped conductor segments each including a turn portion and two straight portions, the U-shaped conductor segments being connected in series by welding at welded portions formed in ends of the straight portions, and a stator core formed with slots, the straight portions of each U-shaped conductor segment being accommodated in corresponding two of the slots; and
   a rotor,
   wherein a welded side slot pitch is the interval along the circumferential direction between two straight portions of each conductor segment on a welded side, and the welded side slot pitch is narrower than an N-S magnetic pole pitch of the rotor, and
   the stator winding includes overlapped wire wrapping sections each constituted of the U-shaped conductor segments accommodated in the corresponding two of the slots, and crossover wires disposed on the side of the welded portions for connecting the overlapped wire wrapping sections, wherein the crossover wires include first crossover wires for connecting the ends of the U-shaped conductor segments disposed on an innermost side of the stator core, and second crossover wires for connecting the ends of the U-shaped conductor segments disposed on an outermost side of the stator core.

2. The electric rotating machine according to claim 1, wherein a non-welded side slot pitch as an interval of the corresponding two of the slots on the side of the turn portions is narrower than the N-S magnetic pole pitch.

3. An electric rotating machine comprising:
a stator including a stator winding constituted of a plurality of U-shaped conductor segments each including a turn portion and two straight portions, the U-shaped conductor segments being connected in series by welding at welded portions formed in ends of the straight portions, and a stator core formed with slots, the straight portions of each U-shaped conductor segment being accommodated in corresponding two of the slots; and
a rotor,
wherein a welded side slot pitch is the interval along the circumferential direction between two straight portions of each conductor segment on a welded side, and the welded side slot pitch is narrower than an N-S magnetic pole pitch of the rotor, and the stator winding includes overlapped wire wrapping sections each constituted of the U-shaped conductor segments accommodated in the corresponding two of the slots, and crossover wires disposed on the side of the welded portions for connecting the overlapped wire wrapping sections, wherein both the welded side slot pitch and non-welded side slot pitch are narrower than the N-S magnetic pole pitch of the rotor.

4. The electric rotating machine according to claim 3, wherein the stator winding is constituted of a plurality of phase windings, and at least parts of the slots accommodate the straight portions of the overlapped wire wrapping sections of different two of the phase windings.

5. The electric rotating machine according to claim 3, wherein each of the crossover wires extends in the circumferential direction at a position radially adjacent to a corresponding one of the overlapped wire wrapping sections constituting the coil end.

6. The electric rotating machine according to claim 5, wherein the crossover wires extend in the circumferential direction at positions distributed on a radially inside and a radially outside of the overlapped wire wrapping sections constituting the coil end.

7. The electric rotating machine according to claim 5, wherein, the stator is configured to be cooled by coolant when the electric rotating machine is in operation, the crossover wires being disposed in a coolant supply passage.

* * * * *